United States Patent
Harada et al.

(10) Patent No.: US 11,777,607 B2
(45) Date of Patent: Oct. 3, 2023

(54) DOWNSTREAM FRAME TRANSFER DEVICE, TRANSFER METHOD, AND TRANSFER PROGRAM

(71) Applicant: NIPPON TELEGRAPH AND TELEPHONE CORPORATION, Tokyo (JP)

(72) Inventors: Rintaro Harada, Musashino (JP); Hiroyuki Uzawa, Musashino (JP); Hirotaka Nakamura, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 86 days.

(21) Appl. No.: 17/431,668

(22) PCT Filed: Feb. 14, 2020

(86) PCT No.: PCT/JP2020/005802
§ 371 (c)(1),
(2) Date: Aug. 17, 2021

(87) PCT Pub. No.: WO2020/170965
PCT Pub. Date: Aug. 27, 2020

(65) Prior Publication Data
US 2022/0123838 A1    Apr. 21, 2022

(30) Foreign Application Priority Data
Feb. 22, 2019   (JP) ................... 2019-030841

(51) Int. Cl.
*H04B 10/27* (2013.01)
(52) U.S. Cl.
CPC .................. *H04B 10/27* (2013.01)

(58) Field of Classification Search
CPC .... H04B 10/27; H04B 10/272; H04B 10/275; H04J 14/08
See application file for complete search history.

(56) References Cited

U.S. PATENT DOCUMENTS

| | | | |
|---|---|---|---|
| 2011/0194854 A1* | 8/2011 | Freire | H04J 3/1694 398/58 |
| 2017/0279665 A1* | 9/2017 | Mukai | H04Q 11/0067 |

(Continued)

FOREIGN PATENT DOCUMENTS

| | | |
|---|---|---|
| JP | 2015043501 A | 3/2015 |
| WO | WO-2016030961 A1 | 3/2016 |

OTHER PUBLICATIONS

3GPP TR38.801 v14. 0.0 (Mar. 2017), 2017.

(Continued)

*Primary Examiner* — Dzung D Tran
(74) *Attorney, Agent, or Firm* — Harness, Dickey & Pierce, P.L.C.

(57) ABSTRACT

A transfer device installed between a host device and a plurality of OLTs in a communication system to which a network with a PON configuration including the plurality of OLTs between the host device and a subordinate device is applied, the transfer device including a frame information acquisition unit configured to monitor downstream frames input from the host device and calculate a statistical value of the downstream frames per a predetermined fixed cycle, a frame storage unit including a plurality of queues each configured to store downstream frames to be transferred to the plurality of OLTs, the frame storage unit configured to store the downstream frames input from the host device, a frame sorting unit configured to input the downstream frames to the plurality of queues in the frame storage unit, and a distribution control determination unit configured to (Continued)

determine the number of frames to be sequentially input by the frame sort unit to the plurality of queues based on the statistical value.

8 Claims, 12 Drawing Sheets

(56) References Cited

U.S. PATENT DOCUMENTS

2019/0068307 A1\* 2/2019 Kim .................... H04J 14/0245
2019/0245715 A1\* 8/2019 Hatta ................. H04Q 11/0067

OTHER PUBLICATIONS

Takehiro Nakamura, "Toward Introduction to 5G in 2020", pp. 21, MPLS Japan 2016, 2016.
Iwao Toda, "Network QoS Technology", pp. 182-183, Ohmsha, Ltd., 2001.
Harada, Rintaro, et al., "Downlink data transfer method that realizes PON's speed upgrade in the stages", Lecture Proceedings of the 2019 general conference of IEICE: Communication 2, Mar. 5, 2019, p. 158, entire text, all drawings.
International Search Report issued in PCT/JP2020/005802, dated Mar. 17, 2020.

\* cited by examiner

DOWNSTREAM FRAME TRANSFER DEVICE, TRANSFER METHOD, AND TRANSFER PROGRAM

CROSS-REFERENCE TO RELATED APPLICATIONS

This application is a 371 U.S. National Phase of International Application No. PCT/JP2020/005802 filed on Feb. 14, 2020 which claims priority to Japanese Application No. 2019-030841 filed on Feb. 22, 2019. The entire disclosures of the above applications are incorporated herein by reference.

TECHNICAL FIELD

The present invention relates to a downstream frame transfer device, a transfer method and a transfer program.

BACKGROUND ART

A network on which frames are transferred between a plurality of host devices and a plurality of subordinate devices is used, for example, in mobile fronthaul (MFH) in a mobile system (e.g., see Non Patent Literature 1). Note that, in MFH, a host device corresponds to an aggregation station, and a subordinate device corresponds to an antenna station.

FIG. 7 illustrates an example of a network consisting of a plurality of host devices and a plurality of subordinate devices. In FIG. 7, p (p is a positive integer) host devices 101 and p subordinate devices 102 are connected by optical fibers, and the network between the host devices 101 and the subordinate devices 102 has delay requirements (regulations on a delay time) for frame transfer. In particular, there are strict delay requirements in the MFH, for example, a delay upper limit in lower layer split (LLS) that divides the base station function in the physical layer is specified as 250 [µs] (for example, see Non Patent Literature 2). Here, in FIG. 7 and the subsequent description, in a case in which an individual host device 101 is specified, a number will be added to the end of a reference numeral as in, for example, a host device 101(1). In addition, in a case in which an individual device among a plurality of subordinate devices 102 and a plurality of similar devices described below is specified, a number will be similarly added to the end of a reference numeral.

Here, in the case of a network in which a large number of subordinate devices 102 are deployed, a large number of optical fibers are required between the host devices 101 and the subordinate devices 102. Thus, in order to efficiently build a network between the plurality of host devices 101 and the plurality of subordinate devices 102, application of a passive optical network (PON) is conceivable.

FIG. 8 illustrates an example in which a PON is applied between host devices 101 and subordinate devices 102. The PON is an optical communication system composed of an optical line terminal (OLT) 104, an optical splitter 105, and optical network units (ONUs) 106. Note that the plurality of host devices 101 are connected to the OLT 104 via an OLT-side transfer device 113. In addition, a single optical fiber is connected between the OLT 104 and the optical splitter 105, and is connected to each of the plurality of ONUs 106 via the optical splitter 105. The OLT 104 transfers data to each of the ONUs 106 in time division multiple access (TDMA), and each of the ONUs 106 transfers data to the OLT 104 in time division multiplexing (TDM), and thus even though there is one optical fiber between the OLT 104 and the optical splitter 105, the ONUs 106 can communicate with the OLT 104 without the data colliding. In this manner, the plurality of ONUs 106 share one optical fiber in the PON, which is more efficient than directly connecting the OLT 104 to each ONU 106 with one optical fiber.

However, when the PON is applied to the network between the host devices 101 and the subordinate devices 102, the requisition for a band between the host devices 101 and the subordinate devices 102 increases, and an optical communication speed needs to be increased. For this reason, a method in which multiple PONs are parallelized (e.g., multiple wavelengths) and frames between the host devices 101 and the subordinate devices 102 are distributed and transferred in parallel is conceivable. Multiple PON parallelization will be described below with an example of multiple wavelengths.

FIG. 9 illustrates an example of a configuration in which frames between host devices 101 and subordinate devices 102 are distributed and transferred in parallel in a wavelength group consisting of a plurality of wavelengths. FIG. 9 is different from FIG. 8 for a single wavelength in that a plurality (q (q is a positive integer)) of OLTs 104 are installed, a wavelength multiplexing filter 107 is installed between the group of the plurality of OLTs 104 and an optical splitter 105, and ONU-side transfer devices 108 are installed between ONUs 106 and the subordinate devices 102. Here, a transfer device installed between the host devices 101 and the OLTs 104 is referred to as an OLT-side transfer device 113, and the transfer devices installed between the ONUs 106 and the subordinate devices are referred to as ONU-side transfer devices 108. The OLT-side transfer device 113 is a device having a function of distributing and transferring downstream frames to the plurality of OLTs 104, and the ONU-side transfer devices 108 are devices having a function of integrating the distributed downstream frames. Moreover, each OLT 104 uses a unique and different wavelength, and each OLT 104 is connected to the plurality of ONUs 106 in a one-to-multiple manner using a unique and different wavelength. Note that the number of ONUs 106 connected to one OLT 104 may vary for each OLT 104. ONUs 106 connected to each subordinate device 102 via the same ONU-side transfer device 108 are connected to the OLT 104 using the same wavelength as that of the ONUs 106.

In FIG. 9, downstream frames from each of the host devices 101 are distributed and transferred in parallel to the plurality of the OLTs 104 (a plurality of wavelengths) by the OLT-side transfer device 113. The number of OLTs 104 (corresponding to the number of wavelengths) used by each of the host devices 101 may differ depending on the host devices 101, and the number of ONUs 106 (corresponding to the number of wavelengths) connected to each of the subordinate devices 102 via the ONU-side transfer device 108 may differ depending on the subordinate devices 102. Downstream frames distributed from each of the host devices 101 to the plurality of OLTs 104 are transferred to the ONUs 106 to which each OLT 104 is connected, then integrated by the ONU-side transfer device 108, and received by the corresponding subordinate devices 102. Here, because frames from one host device 101 are distributed and transferred in parallel over a plurality of wavelengths, there is a possibility that the frames may be out of order (change in the frame transfer order) when they are received by the subordinate devices 102. Because the frames need to be transferred to the subordinate devices 102 in the order in which they are output by the host devices 101, the OLT-side transfer device 113 and the ONU-side transfer devices 108 perform frame order control. Thus, the OLT-side transfer device 113 gives a sequence number to each frame input from the host devices 101 and transfers the frames. Then, the ONU-side transfer devices 108 refers to the sequence numbers of the frames input from the plurality of connected ONUs 106, arranges the frames in the order of the sequence numbers, and outputs the frames to the subordinate devices 102.

Here, as a method of the OLT-side transfer device 113 to distribute and transfer the downstream frames in parallel to the plurality of the OLTs 104, an application of a round robin (RR) method is conceivable (for example, see Non Patent Literature 3).

FIG. 10 illustrates an example of a queue configuration when downstream frames are distributed and transferred in parallel over a plurality of wavelengths. In FIG. 10, the OLT-side transfer device 113 includes q queues (referred to as an OLT-side queue 201(1) to an OLT-side queue 201($q$)) when the number of wavelengths is q ($\lambda_1$ to $\lambda_q$). In addition, frames from each of the host devices 101 are input to the OLT-side queue 201(1) to the OLT-side queue 201($q$) in an RR method. The number of frames from the host device 101($i$) (1≤i≤p) input to the OLT-side queue 201($k$) (1≤k≤q) in one round of the RR method (a cycle in which frames are input at a time to the same number of queues as the number of wavelengths that the host devices 101 can use) is $r_{ik}$ (1 or 0 which is the number of frames from the host device 101($i$) input to the OLT-side queue 201($k$) in one round). Furthermore, $r_{ik}$ is equal to 1 when the host device 101($i$) uses the wavelength $\lambda_k$, and $r_{ik}$ is equal to 0 when the host device 101($i$) does not use the wavelength $\lambda_k$. Here, whether the host device 101($i$) uses the wavelength $\lambda_k$ is assumed to be predetermined. In addition, frames stored in the OLT-side queue 201($k$) are transferred to the OLT 104($k$) (the OLT 104 using the wavelength $\lambda_k$). Frames of the host device 101($i$) transferred to the OLT 104($k$) are forwarded to a destination ONU 106($ik$) using the wavelength $\lambda_k$ and received by a subordinate device 102($i$) via an ONU-side transfer device 108.

FIG. 11 illustrates an example of a configuration of an OLT-side transfer device 113 for implementing the RR method. In FIG. 11, the OLT-side transfer device 113 includes a frame sorting unit 311 and a frame storage unit 302.

The frame sorting unit 311 identifies which host device 101 the frame input to the OLT-side transfer device 113 is from. A unique value (e.g., a VLAN identifier (VID)) is used to identify each of the plurality of host devices 101. Next, the frame sorting unit 311 gives a sequence number to a frame for each host device 101 among the input frames. Furthermore, the frame sorting unit 311 inputs the frame from each of the host devices 101 into the queue in the frame storage unit 302 in the RR method based on the preset value of $r_{ik}$. Here, k is an integer satisfying 1≤k≤q, and i is an integer satisfying 1≤i≤p.

The frame storage unit 302 includes the same number of queues (from the OLT-side queue 201(1) to the OLT-side queue 201($q$)) as the number of wavelengths q. A queue into which the frame is input is determined by the frame sorting unit 311, and the frame is stored in the determined queue. In addition, the stored frame is output to the OLT 104 to which the OLT-side queue 201 is connected.

Here, as an alternative, the application of a weighted round robin (WRR) method is conceivable (see, for example, Non Patent Literature 3). The WRR method is basically the same as the RR method, except that values other than 1 and 0 can also be set for the number of frames $r_{ik}$ from the host device 101($i$) input to the OLT-side queue 201($k$). Note that each value of $r_{ik}$ is assumed to be set in advance.

CITATION LIST

Non Patent Literature

Non Patent Literature 1: 3GPP TR38.801 v14.0.0 (2017-03), 2017.

Non Patent Literature 2: Takehiro Nakamura, "Toward Introduction to 5G in 2020", pp. 21, MPLS Japan 2016, 2016.

Non Patent Literature 3: Iwao Toda, "Network QoS Technology", pp. 182-183, Ohmsha, Ltd., 2001.

SUMMARY OF THE INVENTION

Technical Problem

In an application of a network including a host device 101 and a subordinate device 102 (for example, a mobile system) in which downstream frames are output from the host device 101 to the subordinate device 102 in a burst manner at each fixed cycle, the downstream frames at MFH are output from the aggregation station (host device) to the antenna station (subordinate device) in a burst manner at the fixed cycle (e.g., 1 [ms]), but as the amount of traffic of users increases, the number of frames output at each of the fixed cycles increases. Further, as a speed of wireless communication becomes higher, a speed of frame output from the aggregate station becomes higher. Here, a case is considered in which, for example, in a network in which the number of host devices 101 is two (a host device 101(1) and a host device 101(2)) and the number of wavelengths is 2 ($\lambda_1$ and $\lambda_2$), a frame output speed of the host device 101(1) is higher than a frame output speed of the host device 101(2).

The host device 101(1) uses the wavelength $\lambda_1$ and the wavelength $\lambda_2$ because the frame output speed is high and the number of frames output at each fixed cycle is large. On the other hand, the host device 101(2) uses only the wavelength $\lambda_1$ because the frame output speed is not high and the number of frames output at the fixed cycle is not large in comparison to the host device 101(1). If the RR method is applied to the OLT-side transfer device 113 to which frames from the two host devices 101 are input, the frame from the host device 101(1) is input to the OLT-side queue 201(1) and the OLT-side queue (2) in the RR method, and thus the frame output from the host devices 101(1) at the fixed cycle is stored in half alternately in the OLT-side queue 201(1) and the OLT-side queues 201(2). Note that the frame from the host device 101(2) is input to only the OLT-side queue 201(1). In addition, the frame from the host device 101(1) and the frame from the host device 101(2) stored in the OLT-side queue 201(1) are transferred to the OLT 104(1) using the wavelength $\lambda_1$, and the frame from the host device 101(1) stored in the OLT-side queue (2) is transferred to the OLT 104(2) using the wavelength λ2. At this time, while the frame from the host device 101(1) and the frame from the host device 101(2) are transferred on the path of the wavelength $\lambda_1$, only the frame from the host device 101(1) is transferred on the path of the wavelength $\lambda_2$, and thus the frame of the host device 101(1) is input to the ONU-side transfer device 108 out of order.

FIG. 12 illustrates an example of a state in which frames are out of order. Note that, in FIG. 12, the frames with outline sequence numbers on black background indicate frames of the host device 101(1), and the frames with black sequence numbers on white background indicate frame of the host device 101(2).

Here, it is assumed in FIG. 12 that the frames of the host device 101(1) are transferred to the OLT 104(1) using the wavelength $\lambda_1$ and the OLT 104(2) using the wavelength $\lambda_2$, and the frames of the host device 101(2) are transferred to the OLT 104(1) using the wavelength $\lambda_1$. At this time, because the OLT 104(1) of the wavelength $\lambda_1$ transfers the frames from the host device 101(1) and the host device 101(2), the transfer time thereof is longer than that of the OLT 104(2) of the wavelength $\lambda_2$ that transfers only the frame of the host device 101(1), and the frame is input to the ONU-side transfer device 108 out of order. For example, in the case of FIG. 12, the frames with the sequence numbers 8, 10, and 12 will arrive at the ONU-side transfer device 108 earlier than the frame with the sequence number 7 of the host device 101(1), and thus the frames are out of order.

In this case, in order to output the frames to the subordinate devices 102 by maintaining the frame order as the order of the frames output (e.g., the order of the sequence numbers) from the host devices 101, the ONU-side transfer device 108 retains the frame with the sequence number j (j is a positive integer) in a buffer until a frame with the sequence number j−1 is output. Here, the time period in which the frame is retained in the buffer is referred to as "order-controlled delay". Order-controlled delay occurs when frames cannot be distributed to multiple wavelengths according to an actual traffic volume. When order-controlled delay occurs, it is difficult for all host devices 101 to meet delay requirements (transferring all frames within an upper limit of delay).

In addition, an application of a WRR method is also conceivable in addition to the RR method, but frames are distributed in a plurality of wavelengths according to the preset number of frames $r_{ik}$ in the WRR method, and it is not possible to set the number of frames $r_{ik}$ in accordance with an actual traffic volume, unlike in the RR method.

In this way, the OLT-side transfer devices 113 of the related art have a problem in that they are not able to distribute frames in accordance with an actual traffic volume and thus delay requirements are not satisfied.

The present invention aims to provide a downstream frame transfer device, a transfer method, and a transfer program that enables, in a communication system in which a PON is applied to frame transfer between a host device and a subordinate device, downstream frames to be distributed to a plurality of OLTs to satisfy a desired delay requirement.

Means for Solving the Problem

A downstream frame transfer device according to a first aspect of the present invention is a transfer device installed between a host device and a plurality of OLTs of a communication system to which a network with a PON configuration including the plurality of OLTs between the host device and a subordinate device is applied, and the transfer device includes: a frame information acquisition unit configured to monitor downstream frames input from the host device and calculate a statistical value of the downstream frames per a predetermined fixed cycle; a frame storage unit including a plurality of queues each configured to store downstream frames to be transferred to the plurality of OLTs, the frame storage unit configured to store the downstream frames input from the host device; a frame sorting unit configured to input the downstream frames to the plurality of queues included in the frame storage unit; and a distribution control determination unit configured to determine the number of frames to be sequentially input by the frame sorting unit to the plurality of queues based on the statistical value.

According to a second aspect of the present invention, when the number of host devices is p, the number of parallels in a PON section is q, a minimum integer exceeding the number obtained by dividing the value of the total number of frames input until the frames of all of the host devices take turns around the plurality of queues by the number of OLTs is N, an optical communication speed in the PON section is B, a speed at which a host device i (i is an integer from 1 to p) outputs frames to the transfer device is Ri, the statistical value of the number of downstream frames per the predetermined fixed cycle of the host device i is ni, the statistical value of a maximum value of a downstream frame size per the predetermined fixed cycle is s, a predetermined delay upper limit is y, and the number of frames of the host device i that the frame sorting unit sequentially inputs to the queue connected to an OLTk (k is an integer from 1 to q) is $r_{ik}$, the distribution control determination unit of the transfer device according to the first aspect of the present invention determines N to satisfy the following equation

[Math. 1]

$$N = \left\lceil \frac{1}{q}\sum_{i=1}^{p}\left\lceil \frac{NR_i n_i s}{(n_i-1)Bs + yBR_i - (N-1)R_i s} \right\rceil \right\rceil \quad (1)$$

and determines $r_{ik}$ to satisfy the following equation

[Math. 2]

$$\sum_{k=1}^{q} r_{ik} = \left\lceil \frac{NR_i n_i s}{(n_i-1)Bs + yBR_i - (N-1)R_i s} \right\rceil \quad (2)$$

based on the determined N.

According to a third aspect of the present invention, in the transfer device according to the second aspect of the present invention, the distribution control determination unit sets, in an initial state, the number of downstream frames sequentially input to the plurality of queues in the frame storage unit to 0 or 1, and after the frame information acquisition unit completes calculation of the statistical value, determines the number of downstream frames to be sequentially input into the plurality of queues in the frame storage unit using the statistical value.

According to a fourth aspect of the present invention, in the transfer device according to any one of the first to the third aspects of the present invention, the frame information acquisition unit calculates, as the statistical value, an average of the number of downstream frames per the predetermined fixed cycle and an average of the maximum value of a downstream frame size per the predetermined fixed cycle.

A transfer method according to a fifth aspect of the present invention is a transfer method for processing of a transfer device installed between a host device and a plurality of OLTs in a communication system to which a network with a PON configuration including the plurality of OLTs between the host device and a subordinate device is applied, and the transfer method includes: a frame information acquisition process of monitoring downstream frames input from the host device and calculating a statistical value of the downstream frames per a predetermined fixed cycle; a frame storage process of storing, downstream frames input from the host device to be transferred to the plurality of OLTs in a plurality of queues; a frame sorting process of inputting the downstream frames to the plurality of queues; and a distribution control determination process of determining the number of frames to be sequentially input to the plurality of queues in the frame sorting process unit based on the statistical value.

According to a sixth aspect of the present invention, in the distribution control determination process in the transfer method according to the fifth aspect of the present invention, when the number of host devices is p, the number of parallels in a PON section is q, a minimum integer exceeding the number obtained by dividing the value of the total number of frames input until the frames of all of the host devices take turns around the plurality of queues by the number of OLTs is N, an optical communication speed in the PON section is B, a speed at which a host device i (i is an integer from 1 to p) outputs frames to the transfer device is Ri, the statistical value of the number of downstream frames per the predetermined fixed cycle of the host device i is ni, the statistical value of a maximum value of a downstream frame size per the predetermined fixed cycle is s, a predetermined delay upper limit is y, and the number of frames of the host device i that the frame sorting unit sequentially inputs to the queue connected to an OLTk (k is an integer from 1 to q) is rik, N is determined to satisfy the following equation

[Math. 1]
$$N = \left\lceil \frac{1}{q} \sum_{i=1}^{p} \left\lceil \frac{NR_i n_i s}{(n_i - 1)Bs + yBR_i - (N-1)R_i s} \right\rceil \right\rceil \quad (1)$$

and rik is determined to satisfy the following equation

[Math. 2]
$$\sum_{k=1}^{q} r_{ik} = \left\lceil \frac{NR_i n_i s}{(n_i - 1)Bs + yBR_i - (N-1)R_i s} \right\rceil \quad (2)$$

based on the determined N.

According to a seventh aspect of the present invention, in the transfer device according to any one of the fifth to the sixth aspect of the present invention, in the frame information acquisition process, an average of the number of downstream frames per the predetermined fixed cycle and an average of the maximum value of the downstream frame size per the predetermined fixed cycle are calculated as the statistical value.

An eighth aspect of the present invention is a transfer program causing a computer to execute a process performed by the transfer device according to any one of the first to the fourth aspect of the present invention.

Effects of the Invention

The downstream frame transfer device, the transfer method, and the transfer program according to the present invention enable downstream frames to be distributed to a plurality of OLTs to satisfy a desired delay requirement in a communication system in which a PON is applied to frame transfer between a host device and a subordinate device.

DESCRIPTION OF EMBODIMENTS

Embodiments of a frame transfer device, a transfer method, and a transfer program according to the present invention will be described below with reference to the drawings. Note that the frame transfer device described in the following embodiments corresponds to a system in which a PON is applied to frame transfer between host devices and subordinate devices, and particularly can satisfy delay requirements of downstream frames.

First Embodiment

Figure 1:
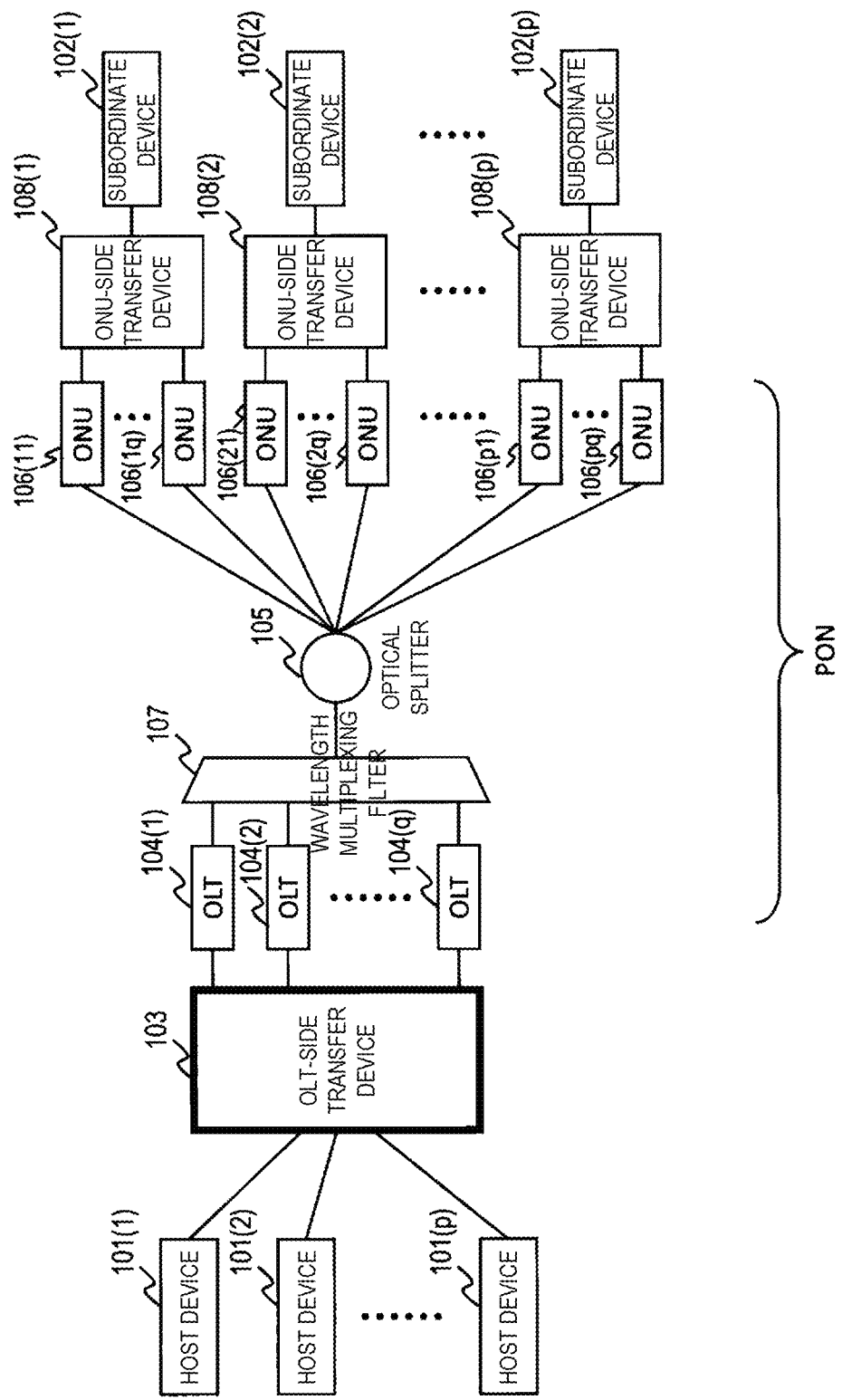
FIG. 1 is a diagram illustrating an example of a configuration of a system using an OLT-side transfer device according to a first embodiment.

FIG. 1 is a diagram illustrating an example of a configuration of a system using an OLT-side transfer device 103 according to a first embodiment. The system of FIG. 1 corresponds to the system of FIG. 9 described in the related art, and the blocks with the same reference numerals as those of FIG. 9 operate the same as or similarly to those of FIG. 9. In particular, the OLT-side transfer device 103 in FIG. 1 and the OLT-side transfer device 113 in FIG. 9 differ in configuration and operation. Note that the OLT-side transfer device 103 corresponds to the frame transfer device according to the present invention.

In FIG. 1, the OLT-side transfer device 103 determines the number of frames to be input to each queue in a single round in which a plurality of queues take turns according to an amount of traffic output by the host devices 101, and performs control to distribute the frames so that all of the frames satisfy delay requirements. Here, the number of frames input in one round is referred to as "the number of distributed frames". Note that a method of calculating the number of distributed frames will be described below in detail.

Figure 2:
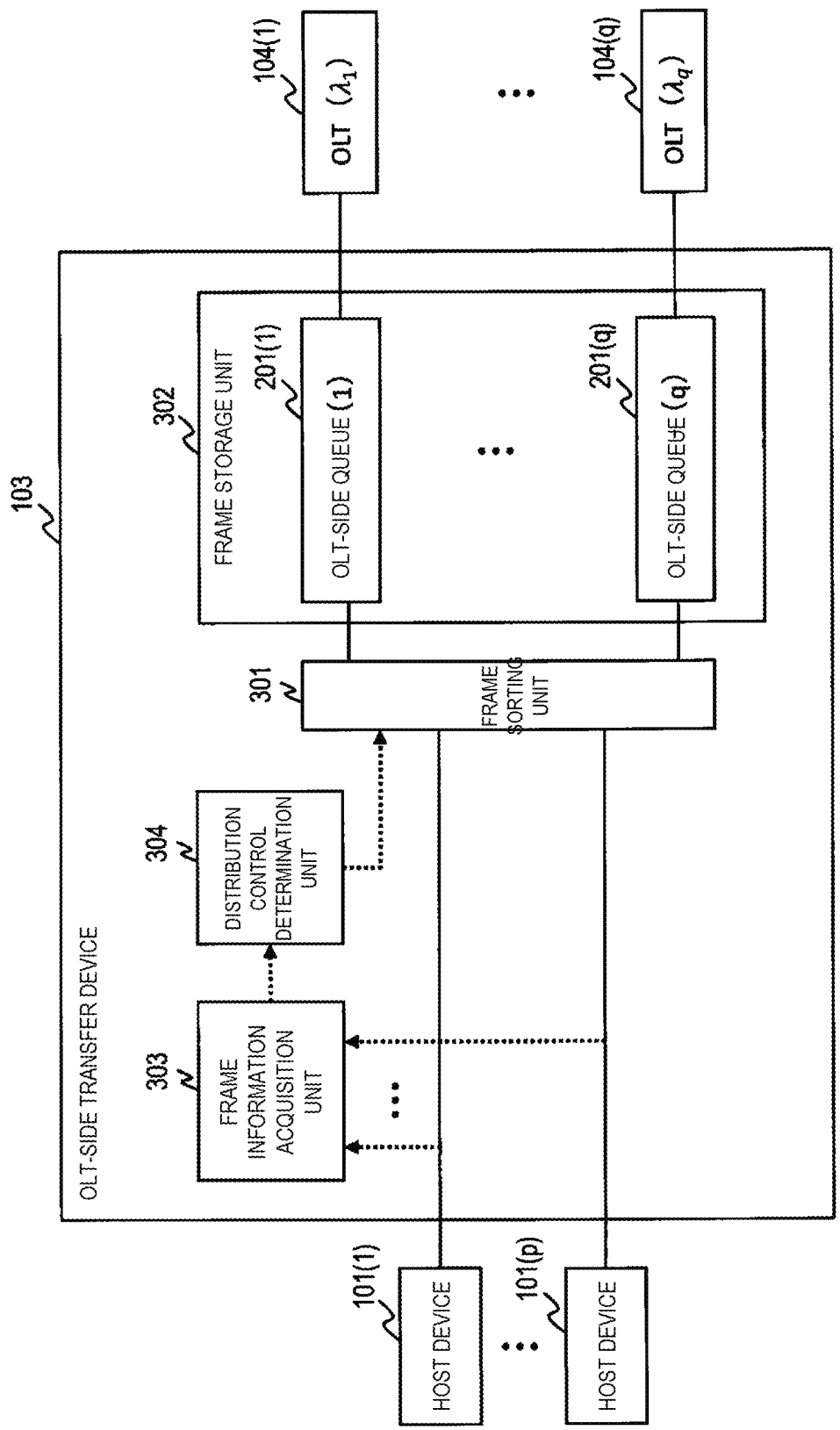
FIG. 2 is a diagram illustrating an example of a configuration of the OLT-side transfer device according to the first embodiment.

FIG. 2 is a diagram illustrating an example of a configuration of the OLT-side transfer device 103 according to the first embodiment. In FIG. 2, the number of host devices 101 is p from the host device 101(1) to the host device 101(p), and the number of wavelengths is q from $\lambda_1$ to $\lambda_q$. Here, an OLT 104(k) (k is an integer satisfying 1≤k≤q) uses a wavelength $\lambda_k$. Note that, although multiple wavelengths are exemplified in the present embodiment, the number of wavelengths q corresponds to the number of parallels when a plurality of PON sections are arranged in parallel.

In FIG. 2, the OLT-side transfer device 103 includes a frame sorting unit 301, a frame storage unit 302, a frame information acquisition unit 303, and a distribution control determination unit 304.

The frame sorting unit 301 identifies which host device 101 the frame input to the OLT-side transfer device 103 is from. A unique value (e.g., a VID) is used to identify each of the plurality of host devices 101. Next, the frame sorting unit 301 gives a sequence number to a frame input from each host device 101. Although the processing up to this point is basically similar to that of the frame sorting unit 311 using the RR method and the WRR method in the related art described in FIG. 11, the difference is that the number of frames calculated by the distribution control determination unit 304, which will be described below, is used for the number of distributed frames input to each queue in the frame storage unit 302 in one round, rather than a preset value. Then, the frame sorting unit 301 inputs the frames from each of the host devices 101 to the queues included in the frame storage unit 302 based on the number of distributed frames (which corresponds to a frame sorting process).

Figure 11:
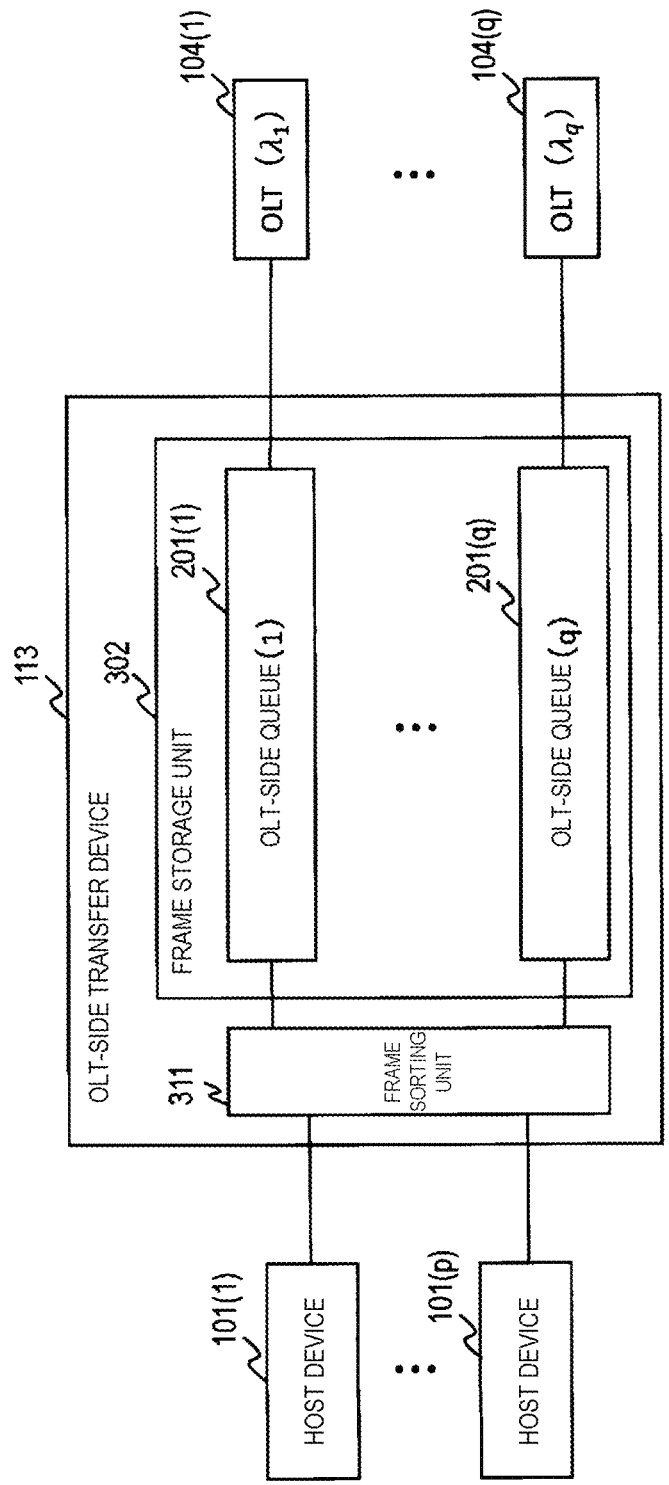
FIG. 11 is a diagram illustrating an example of a configuration of an OLT-side transfer device 113 for implementing an RR method.
Figure 12:
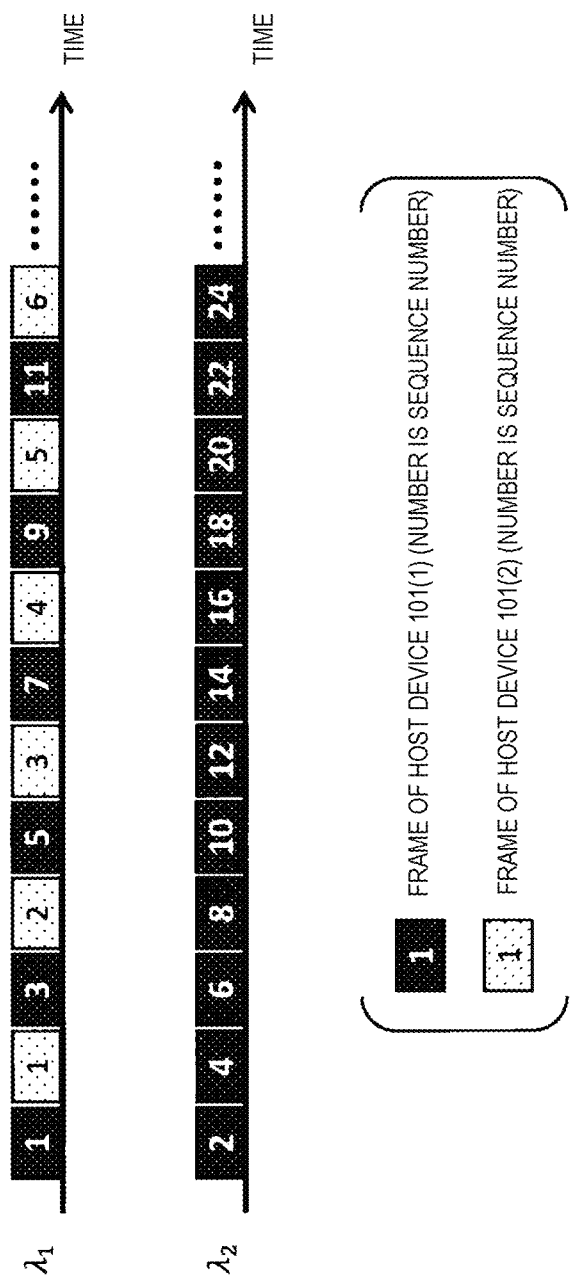
FIG. 12 illustrates an example of a state in which frames are out of order.

The frame storage unit 302 is the same block as the frame storage unit 302 for the RR and WRR methods described in FIG. 11. The frame storage unit 302 includes the same number of queues (an OLT-side queue 201(1) to an OLT-side queue 201(q)) as the number of wavelengths q, and a queue to which a frame is to be input by the frame sorting unit 301 is determined, the frame is stored in the determined queue, and the frame is output to an OLT 104 to which the OLT-side queue 201 is connected (which corresponds to a frame storage process).

The frame information acquisition unit 303 monitors the number of frames output from each of the p host devices 101 and the frame sizes (which corresponds to a frame information acquisition process). Note that, with respect to the number of frames, a statistical value of the number of frames per monitoring cycle is calculated based on the monitoring result for each predetermined fixed cycle (referred to as a "monitoring cycle"). The statistical value is, for example, the average of the number of frames in multiple monitoring cycles. On the other hand, with respect to the frame sizes, the maximum frame sizes observed within the monitoring cycles are retained and a statistical value of the maximum frame sizes per monitoring cycle is further calculated. The statistical value is, for example, the average of the maximum frame sizes in multiple monitoring cycles.

The distribution control determination unit 304 calculates the number of frames (the number of distributed frames) input by the frame sorting unit 301 in one round in which the plurality of queues included in the frame storage unit 302 take turns (which corresponds to a distribution control determination process). The number of distributed frames is determined by first determining a maximum value per wavelength of the number of frames to be transmitted at each wavelength in one round (referred to as "the maximum number of rounded frames") and then based on a statistical value of an amount of traffic (e.g., the number of frames) of each host device 101 based on the determined maximum number of rounded frames. Here, an update cycle of the maximum number of rounded frames and the number of distributed frames is set to the same length as the monitoring cycle of the frame information acquisition unit.

Method for Calculating Maximum Number of Rounded Frames and Number of Distributed Frames Next, a method for the distribution control determination unit 304 to calculate the maximum number of rounded frames and the number of distributed frames will be described in detail.

The distribution control determination unit 304 first determines the maximum number of rounded frames N (N is a positive integer) to satisfy the following equation (1). Note that the maximum number of rounded frames N is a minimum integer greater than the number obtained by dividing a total number of frames input by all of the host devices 101 until the frames take turns around the plurality of OLT-side queues 201 by the number of OLTs 104.

Based on the determined maximum number of rounded frames N, the distribution control determination unit 304 determines the number of frames (the number of distributed frames $r_{ik}$) from the host device 101(i) to be input in one round to the OLT-side queue 201(k) to satisfy the following equation (2). The distribution control determination unit 304 repeatedly executes the procedure at each monitoring cycle of the frame information acquisition unit 303.

[Math. 3]

$$N = \left\lceil \frac{1}{q} \sum_{i=1}^{p} \left\lceil \frac{NR_i n_i s}{(n_i - 1)Bs + yBR_i - (N-1)R_i s} \right\rceil \right\rceil \quad (1)$$

$$\sum_{k=1}^{q} r_{ik} = \left\lceil \frac{NR_i n_i s}{(n_i - 1)Bs + yBR_i - (N-1)R_i s} \right\rceil \quad (2)$$

($\lceil x \rceil$ indicates a minimum integer of $x$ or greater)

Moreover, the variables of the equations (1) and (2) indicate as follows.

p: The number of host devices 101
i: Host device 101 number
q: The number of OLTs 104 (the number of wavelengths)
k: OLT 104 number (wavelength number)
N: The maximum number of rounded frames
s: Statistical value of maximum frame size [bit]
$n_i$: Statistical value of the number of frames per monitoring cycle of the host device 101(i)
$R_i$: Frame output speed of the host device 101(i) [bps]
B: Optical communication speed per wavelength (bps)
y: Delay upper limit [s]
$r_{ik}$: The number of frames from the host device 101(i) to the OLT 104(k) (the number of distributed frames)

Here, in the equations (1) and (2), the number of host devices 101p, the number of OLTs 104 (the number of wavelengths) q, the maximum number of rounded frames N, the statistical value of the maximum frame sizes s, the optical communication speed B, and the delay upper limit y are values that are not dependent on the host devices 101. On the other hand, the statistical value $n_i$ of the number of frames and the frame output speed $R_i$ per monitoring cycle of the host device 101($i$) (1≤$i$≤p) may differ depending on the host devices 101. Moreover, the individual frame sizes, number of frames, optical communication speed B, and frame output speed $R_i$ are values that are systematically determined. Note that, for the delay upper limit y, a value systematically determined may be used, or a value determined in advance based on a value determined systematically may be used. In addition, although a value common for all of the host devices 101 (all of the subordinate devices 102) is used for the delay upper limit y in the present embodiment, the delay upper limit y may differ depending on each host device 101 (each subordinate device 102) or each ONU.

Derivation Process of Equations (1) and (2)

The derivation process of the equations (1) and (2) will be described below.

The maximum number of rounded frames and the number of distributed frames are determined such that a frame delay time estimated under an assumed worst condition is less than or equal to a preset delay upper limit based on statistical values of the number of frames output by each host device 101 at each monitoring cycle and the frame size. In this way, by estimating a delay time under the worst condition, it is possible to determine the maximum number of rounded frames and the number of distributed frames $r_{ik}$ that allow all frames to be transferred from the host devices 101 to the subordinate devices 102 for a period of time within the delay upper limit.

Here, the delay time is a total value of the difference between a time at which frames are input to the queues in the OLT-side transfer device 103 and a time at which the frames are output from the queues (referred to as a "queuing delay") and a delay for arranging a group of frames that are out of order in order of the sequence numbers in the ONU-side transfer devices 108 ("order-controlled delay").

Next, methods for deriving a queuing delay and an order-controlled delay, respectively, will be described.

First, a queuing delay can be determined as follows. In general, supposing that a frame input speed with respect to a queue is R [bps], a frame output speed from a queue is B [bps], and a frame size is s [bit] and assuming that B<R and frames are input to the queues in a burst fashion from a time 0, then, an input time of an n-th (n≥2) frame from the beginning of the burst to the queue can be expressed using the equation (3).

[Math. 4]

$$I(n) = I(n-1) + \frac{s}{R} [s] \quad (3)$$

On the other hand, an output time of the n-th (n≥2) frame from the beginning of the burst from the queue can be expressed using the equation (4).

[Math. 5]

$$O(n) = O(n-1) + \frac{s}{B} [s] \quad (4)$$

In addition, when a queuing delay of the n-th (n≥2) frame from the beginning of the burst is D(n), the recurrence equation between the two terms of the equation (5) is established for D(n).

[Math. 6]

$$D(n) = O(n) - I(n) = D(n-1) + s\left(\frac{1}{B} - \frac{1}{R}\right)[s] \quad (5)$$

The equation (6) is established for the leading frame of the burst (n=1).

[Math. 7]

$$D(1) = O(1) - I(1) = \left\{I(1) + \frac{s}{B}\right\} - I(1) = \frac{s}{B}[s] \quad (6)$$

From the equations (5) and (6), a general equation for queuing delays can be expressed as the equation (7).

[Math. 8]

$$D(n) = \frac{ns}{B} - \frac{(n-1)s}{R}[s] \quad (7)$$

In the frame transfer method according to the present embodiment, a frame input speed from the host device 101($i$) to the OLT-side transfer device 103 is $R_i$ [bps], a frame output speed from the OLT-side queue 201($k$) is B [bps], the number of frames per monitoring cycle (statistical value) is $n_i$, and a maximum frame size (statistical value) is s [bit]. In addition, for the host device 101($i$), the following number of frames are input to the plurality of queues in one round.

[Math. 9]

$$\sum_{k=1}^{q} r_{ik} \text{ [Number (of frames)]}$$

Thus, a total frame output speed from the plurality of queues can be estimated as follows.

[Math. 10]

$$\frac{\sum_{k=1}^{q} r_{ik}}{N} B \ [bps]$$

As described above, the queuing delay of the host device 101($i$) is obtained using the equation (8).

[Math. 11]

$$D_i(n_i) = \frac{n_i s}{\frac{\sum_{k=1}^{q} r_{ik}}{N} B} - \frac{(n_i - 1)s}{R_i}[s] \quad (8)$$

Next, a method for obtaining a maximum value of an order-controlled delay will be described. An order-controlled delay has a maximum value when only one host device 101 (e.g., the host device 101(1)) uses a plurality of wavelengths (e.g., a wavelength $\lambda_1$ and a wavelength $\lambda_2$). In this case, the maximum value of the number of frames transferred at one wavelength in one round (the maximum number of rounded frames) is N, and thus the first frame to the N-th frame of one round are stored in the OLT-side queue 201(1), and the (N+1)-th frame to the 2N-th frame are stored in the OLT-side queue 201(2). The frames stored in the OLT-side queue 201(1) are transferred at the wavelength $\lambda_1$ and the frames stored in the OLT-side queue 201(2) are transferred at the wavelength $\lambda_2$ in parallel. On the other hand, the (N+1)-th frame stored at the beginning of the OLT-side queue 201(2) is not received by a subordinate device 102 until the N-th frame stored at the end of the OLT-side queue 201(1) is received by a subordinate device 102. In other words, an order-controlled delay equivalent to N−1 frames occurs at the (N+1)-th frame, and the value is as follows.

[Math. 12]
$$\frac{s(N-1)}{B}[s]$$

This is the maximum value of the order-controlled delay.

As described above, the delay time of the host device 101(i) can be expressed using the equation (9).

[Math. 13] (9)
$$\frac{n_i s}{\frac{\sum_{k=1}^{q} r_{ik}}{N} B} - \frac{(n_i-1)s}{R_i} + \frac{s(N-1)}{B}$$

The condition of the number of distributed frames $r_{ik}$ for the delay time obtained using the equation (9) to be within the delay upper limit is expressed by the relationship (10).

[Math. 14] (10)
$$\frac{n_i s}{\frac{\sum_{k=1}^{q} r_{ik}}{N} B} - \frac{(n_i-1)s}{R_i} + \frac{s(N-1)}{B} \leq y \iff \sum_{k=1}^{q} r_{ik} \geq \frac{NR_i n_i s}{(n_i-1)Bs + yBR_i - (N-1)R_i s}$$

The number of distributed frames may be expressed as the equation (2) described above because the number of distributed frames may be a minimum integer satisfying the equation (10).

Here, in order for the total host devices (the host devices 101(1) to 101(p)) to satisfy the delay requirement, the equation (10) needs to be established for all of the host devices, and the maximum number of rounded frames N must be determined such that the equation (2) is established for all of the host devices. If both sides of the equation (2) are summed for all of the host devices to derive the equation (1) for determining such a maximum number of rounded frames N, equation (11) is obtained.

[Math. 15] (11)
$$\sum_{i=1}^{p} \sum_{k=1}^{q} r_{ik} = \sum_{i=1}^{p} \left\lceil \frac{NR_i n_i s}{(n_i-1)Bs + yBR_i - (N-1)R_i s} \right\rceil$$

Here, the equation (12) is established on the left side of the equation (11).

[Math. 16] (12)
$$\sum_{i=1}^{p} \sum_{k=1}^{q} r_{ik} = \sum_{k=1}^{q} \sum_{i=1}^{p} r_{ik} \left[ \text{Number of } f \text{rames transferred at each wavelength in one round}: \sum_{i=1}^{p} r_{ik} \text{ [Number (of frames)]} \right]$$

The relationship (13) is established on the right side of the equation (12) because the number of frames transferred at each wavelength in one round is determined to be equal to or less than the maximum number of rounded frames N.

[Math. 17] (13)
$$\sum_{k=1}^{q} \sum_{i=1}^{p} r_{ik} \leq \left( \sum_{k=1}^{q} N \right) = qN$$

Then, the equation (14) is established using the equations (11) and (12), and the relationship (13).

[Math. 18] (14)
$$qN \geq \sum_{i=1}^{p} \left\lceil \frac{NR_i n_i s}{(n_i-1)Bs + yBR_i - (N-1)R_i s} \right\rceil$$

The maximum number of rounded frames may be expressed as the equation (1) described above because the maximum number of rounded frames may be considered as an integer satisfying the equation (14). That is, the maximum number of rounded frames N is a minimum integer greater than the number obtained by dividing a total number of frames input by all of the host devices 101 until the frames take turns around the plurality of OLT-side queues 201 by the number of OLTs 104.

As described above, the equations (1) and (2), which are required in the procedure of the distribution control determination unit 304 to determine the maximum number of rounded frames and the number of distributed frames, can be derived.

Example of Configuration of ONU-side Transfer Device 108

Figure 3:
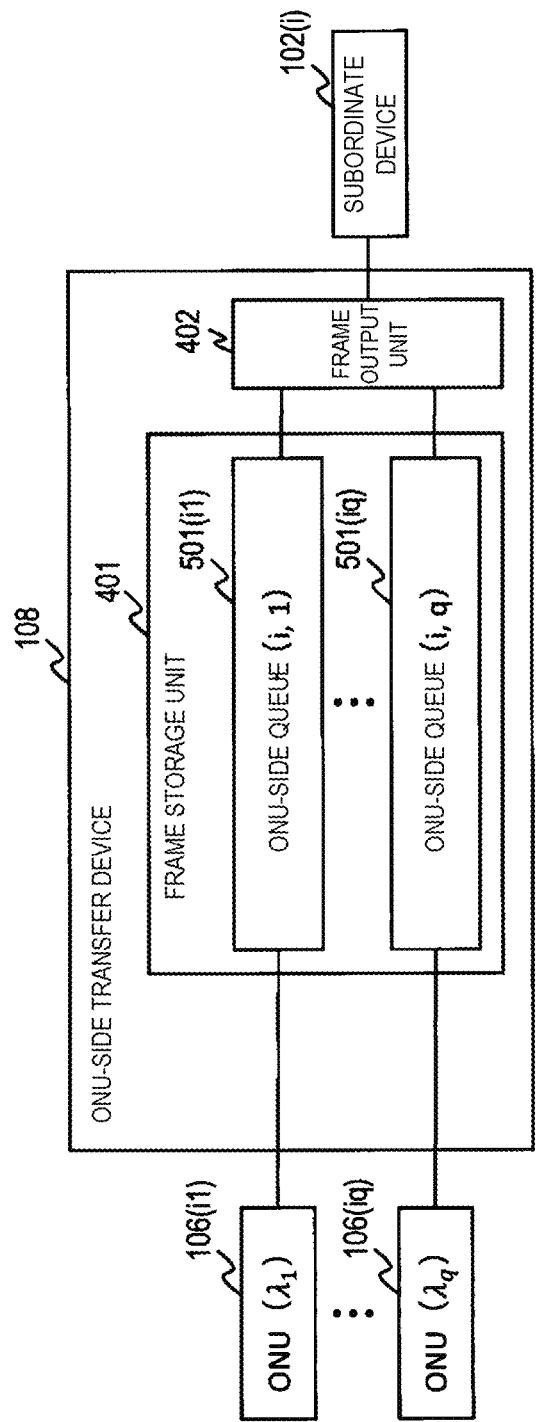
FIG. 3 is a diagram illustrating an example of a configuration of an ONU-side transfer device.

FIG. 3 is a diagram illustrating an example of a configuration of the ONU-side transfer device 108. In FIG. 3, one i-th subordinate device 102(i) (1≤i≤p) is connected, and q ONUs including an ONU 106(i1) to an ONU 106(iq) corresponding to the i-th subordinate device 102(i) are connected. Here, the ONU 106(ik) (1≤k≤q) indicates the k-th ONU 106 that receives the frame corresponding to the i-th host device 101(i), and uses a wavelength $\lambda_k$.

Next, each unit of the ONU-side transfer device 108 illustrated in FIG. 3 will be described in detail. In FIG. 3, the ONU-side transfer device 108 includes a frame storage unit 401 and a frame output unit 402.

The frame storage unit 401 includes q queues (referred to as an ONU-side queue 501($i$, 1) to an ONU-side queue 501($i$, $q$)), q being the number equal to the number of wavelengths. The q ONUs 106 connected to the ONU-side transfer device 108 and the q ONU-side queues 501 in the frame storage unit 401 correspond one-to-one, and frames from the ONU 106($ik$) are stored in an ONU-side queue 501($ik$).

The frame output unit 402 refers to the sequence number of the leading frame of each ONU-side queue 501 in the frame storage unit 401, and outputs the frame with the smallest sequence number and transfers it to the subordinate device 102($i$).

Transfer Process of OLT-Side Transfer Device 103

Next, a process of the OLT-side transfer device 103 to transfer downstream frames will be described.

Figure 4:
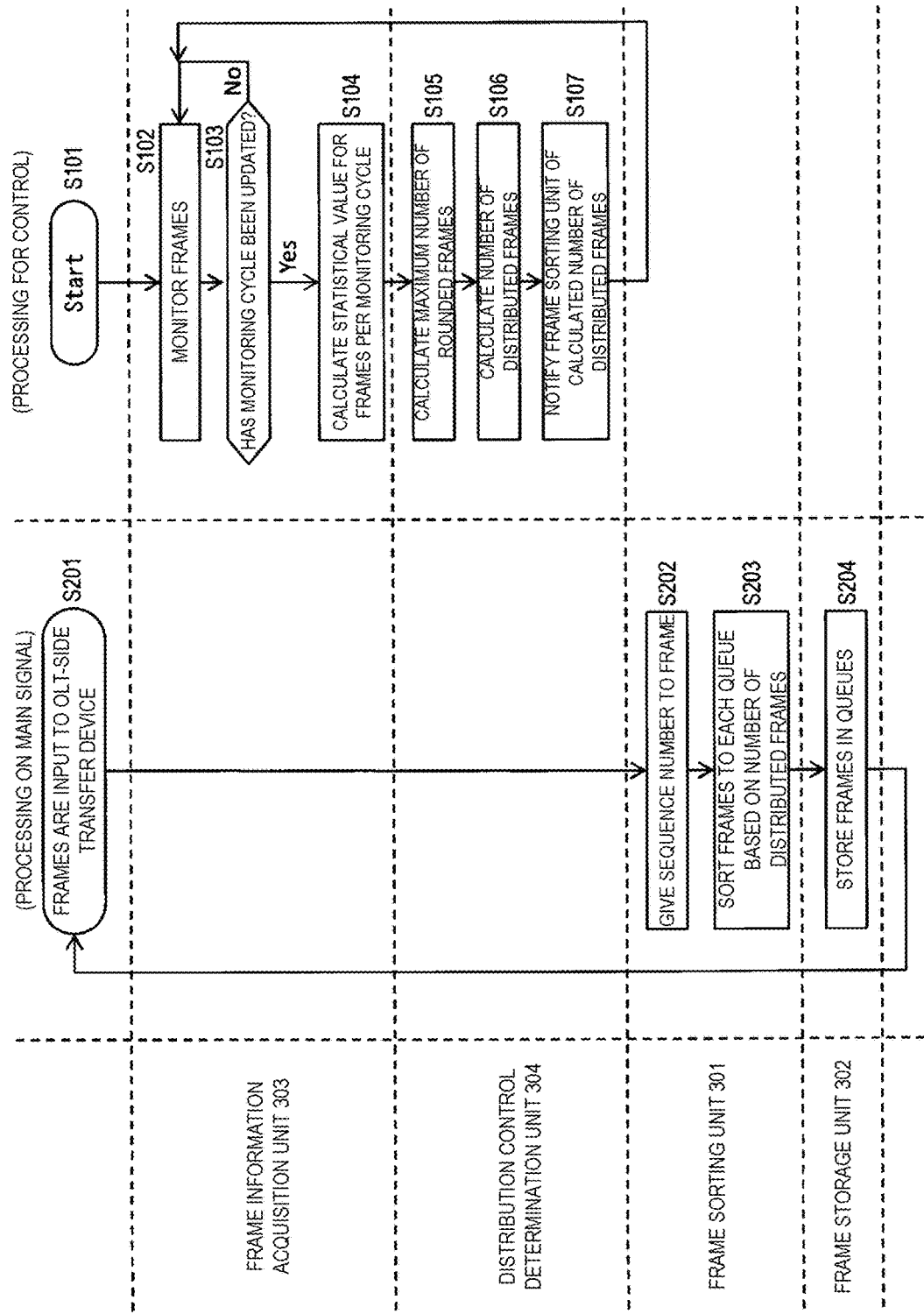
FIG. 4 is a diagram illustrating an example of a process of the OLT-side transfer device transferring downstream frames.

FIG. 4 illustrates an example of a process of the OLT-side transfer device 103 to transfer downstream frames. Note that, in FIG. 4, this process will be described by dividing it into processing on a main signal and processing for control is described. Here, the processing on a main signal is performed by the frame sorting unit 301 and the frame storage unit 302 of the OLT-side transfer device 103 described in FIG. 2. Furthermore, the processing for control is performed by the frame information acquisition unit 303 and the distribution control determination unit 304 of the OLT-side transfer device 103 described in FIG. 2.

First, the processing for control will be described.

In step S101, the system with the OLT-side transfer device 103 according to the present embodiment starts operating.

In step S102, the frame information acquisition unit 303 monitors frames received from the host devices 101.

In step S103, the frame information acquisition unit 303 determines whether the monitoring cycle has been updated. If the monitoring cycle has been updated, the process proceeds to step S104. If the monitoring cycle has not been updated, the process returns to the process of step S102 to repeat the same process.

If the monitoring cycle has been updated, the frame information acquisition unit 303 calculates a statistical value for frames for each ended monitoring cycle while keep monitoring the frames in step S104.

In step S105, the distribution control determination unit 304 uses the statistical value calculated in step S104 to calculate the maximum number of rounded frames according to the equation (1) described above.

In step S106, the distribution control determination unit 304 calculates the number of distributed frames according to the equation (2) described above based on the maximum number of rounded frames calculated in step S105. However, the distribution control determination unit 304 sets the number of distributed frames to 0 or 1 until the frame information acquisition unit 303 calculates the number of frames per monitoring cycle and the statistical value of the maximum frame size in the monitoring cycle in the initial state.

In step S107, the distribution control determination unit 304 notifies the frame sorting unit 301 of the number of distributed frames calculated in step S106.

As described above, each unit of the OLT-side transfer device 103 repeatedly performs the operation described above at each monitoring cycle.

Next, processing on a main signal will be described.

In step S201, frames are input from the host devices 101 to the OLT-side transfer device 103.

In step S202, the frame sorting unit 301 gives sequence numbers to the frames input from the host devices 101.

In step S203, the frame sorting unit 301 sorts the frames with the sequence numbers given in step S202 to the OLT-side queues 201 in the frame storage unit 302 based on the number of distributed frames determined by the distribution control determination unit 304.

In step S204, the frame storage unit 302 stores the frames sorted by the frame sorting unit 301 in the OLT-side queues 201.

As described above, each unit of the OLT-side transfer device 103 repeatedly performs the operation described above at each frame input.

Here, the frame storage unit 302 sequentially outputs the frames stored in each of the queues and transfers the frames to the OLTs 104. Then, the frames transferred to each of the OLTs 104 are transferred to each of the ONUs 106 serving as destinations. Furthermore, the frames transferred to each of the ONUs 106 are transferred to the ONU-side transfer devices 108 connected to the ONUs 106.

Transfer Process of ONU-Side Transfer Device 108

Next, a process of the ONU-side transfer device 108 to transfer downstream frames will be described.

Figure 5:
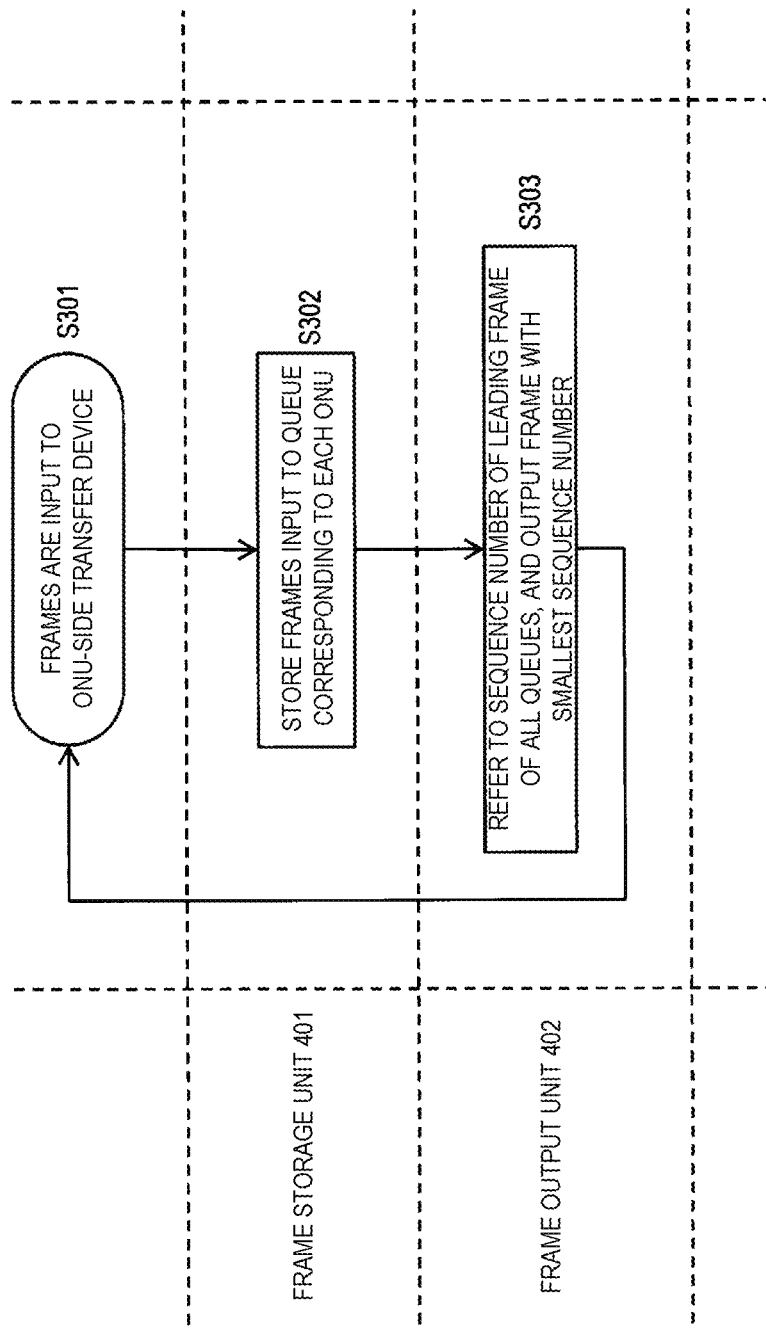
FIG. 5 is a diagram illustrating an example of a process of the ONU-side transfer device transferring downstream frames.

FIG. 5 is a diagram illustrating an example of a process of the ONU-side transfer device 108 transferring downstream frames. Note that the process in FIG. 5 is performed by the frame storage unit 401 and the frame output unit 402 of each ONU-side transfer device 108 illustrated in FIG. 3.

In step S301, frames are input from the ONUs 106 to the ONU-side transfer devices 108.

In step S302, the frame storage unit 401 stores the frames input from the ONUs 106 in the ONU-side queues 501 corresponding to each of the ONUs 106.

In step S303, the frame output unit 402 refers to the sequence numbers of the leading frames on all of the ONU-side queues 501 in the frame storage unit 401, and outputs the frame with the smallest sequence number and transfers it to the subordinate device 102($i$).

As described above, each unit of the ONU-side transfer device 108 repeatedly performs the operation described above each time a frame is input from the ONUs 106.

As described above, in the communication system in which a PON is applied to frame transfer between the host devices and the subordinate devices, the present embodiment enables downstream frames to be distributed to the plurality of OLTs using the plurality of wavelengths to satisfy the desired delay requirement.

Application Example of First Embodiment

In the first embodiment, the update cycle of the number of distributed frames is equal to the monitoring cycle of the frame information acquisition unit 303. However, in an application example, the update cycle of the number of distributed frames may be different from the monitoring cycle. For example, in the present application example, the update cycle of the number of distributed frames is greater than the monitoring cycle. This is because, if the number of frames and the maximum frame size in traffic to be monitored do not greatly fluctuate at each monitoring cycle, the update cycle of the number of distributed frames may be greater than the monitoring cycle.

Note that, in a frame transfer method of the present application example, a configuration of the OLT-side transfer device and the ONU-side transfer device, a calculation method for the maximum number of rounded frames and the number of distributed frames, and the flow of processing on a main signal in the frame transfer method are the same as those in the first embodiment. The difference between the present application example and the first embodiment is that the maximum number of rounded frames and the update cycle of the number of distributed frames differ.

In the first embodiment, because whether the monitoring cycle has been updated is determined in step S103 of FIG. 4, if updated, the processing from step S104 to step S107 is executed to calculate the number of distributed frames, and the frame sorting unit 301 is notified of the number of distributed frames to be updated, the update cycle of the number of distributed frames is the same as the monitoring cycle.

In contrast, in the present application example, for example, the frame information acquisition unit 303 determines whether the monitoring cycle has been updated a preset number of times (for example, five times) in step S103 of FIG. 4, and if the monitoring cycle has been updated five times, the process proceeds to the process of step S104, and if the monitoring cycle has not been updated five times, the process returns to the process of step S102 and the same process is repeated. As a result, the update cycle of the number of distributed frames can be 5 times the monitoring cycle. Note that the update cycle of the number of distributed frames may not be an integer multiple of the monitoring cycle.

In this manner, because the update cycle of the number of distributed frames can be increased in the present application example, the number of times of the update processing and notification processing of the number of distributed frames is reduced, and thus processing loads can be reduced.

Second Embodiment

In a frame transfer method according to a second embodiment, a configuration of the OLT-side transfer device and the ONU-side transfer device, a calculation method for the maximum number of rounded frames and the number of distributed frames, and a frame transfer method are the same. The first embodiment and the second embodiment differ in the configuration of the system.

Figure 6:
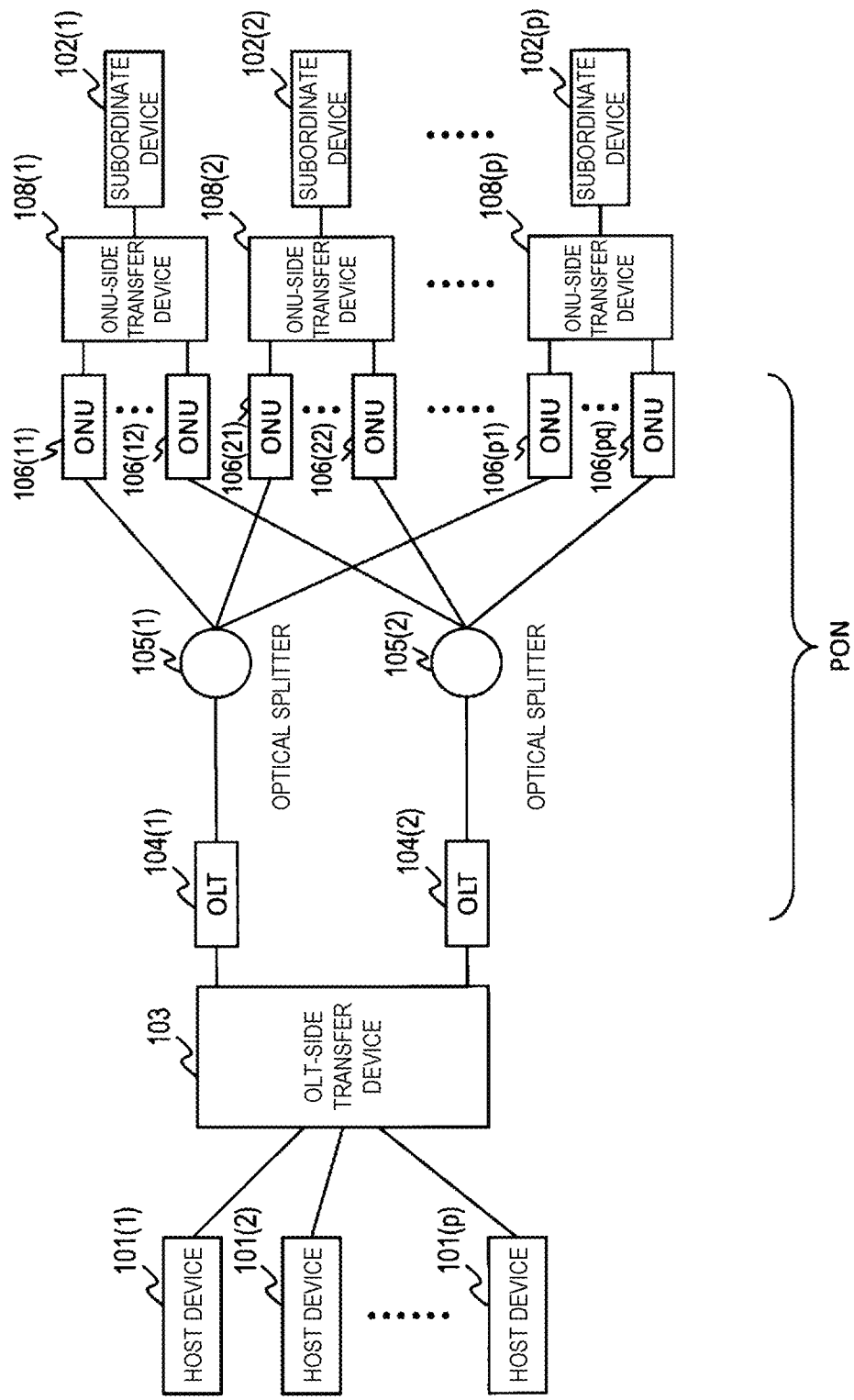
FIG. 6 is a diagram illustrating an example of a configuration of a system according to a second embodiment.
Figure 7:
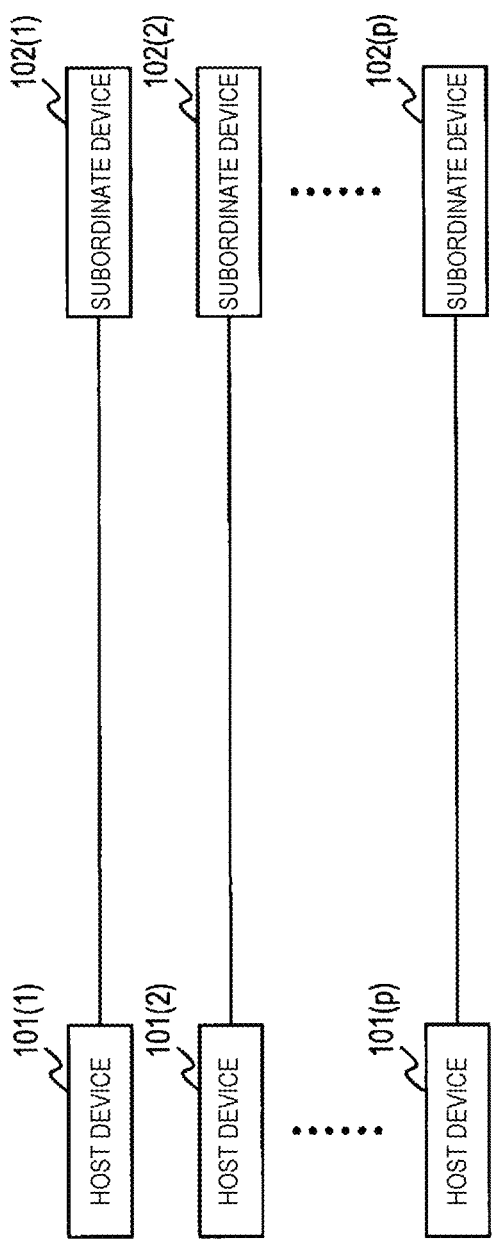
FIG. 7 is a diagram illustrating an example of a network consisting of a plurality of host devices and a plurality of subordinate devices.
Figure 8:
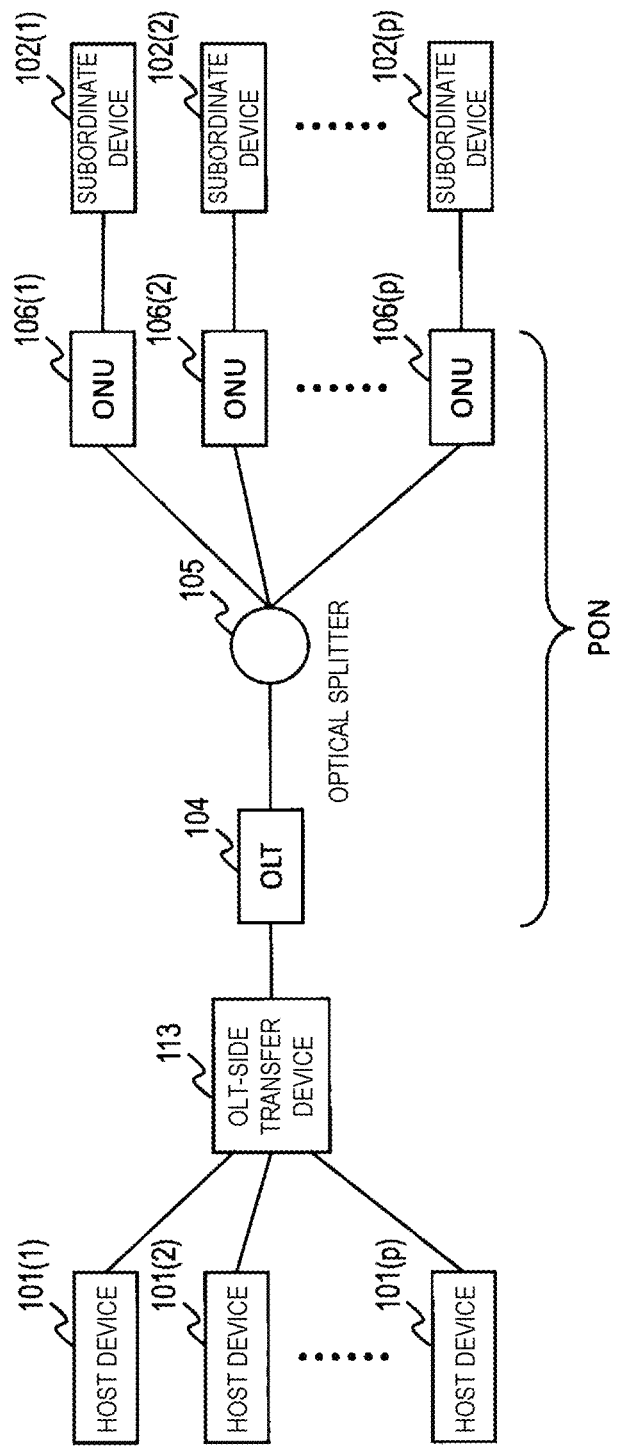
FIG. 8 illustrates an example in which a PON is applied between host devices and subordinate devices.

FIG. 6 is a diagram illustrating an example of a configuration of a system according to the second embodiment. Note that, in FIG. 6, blocks with the same reference signs as those illustrated in FIG. 9 operate similarly to the case of FIG. 9.

Figure 9:
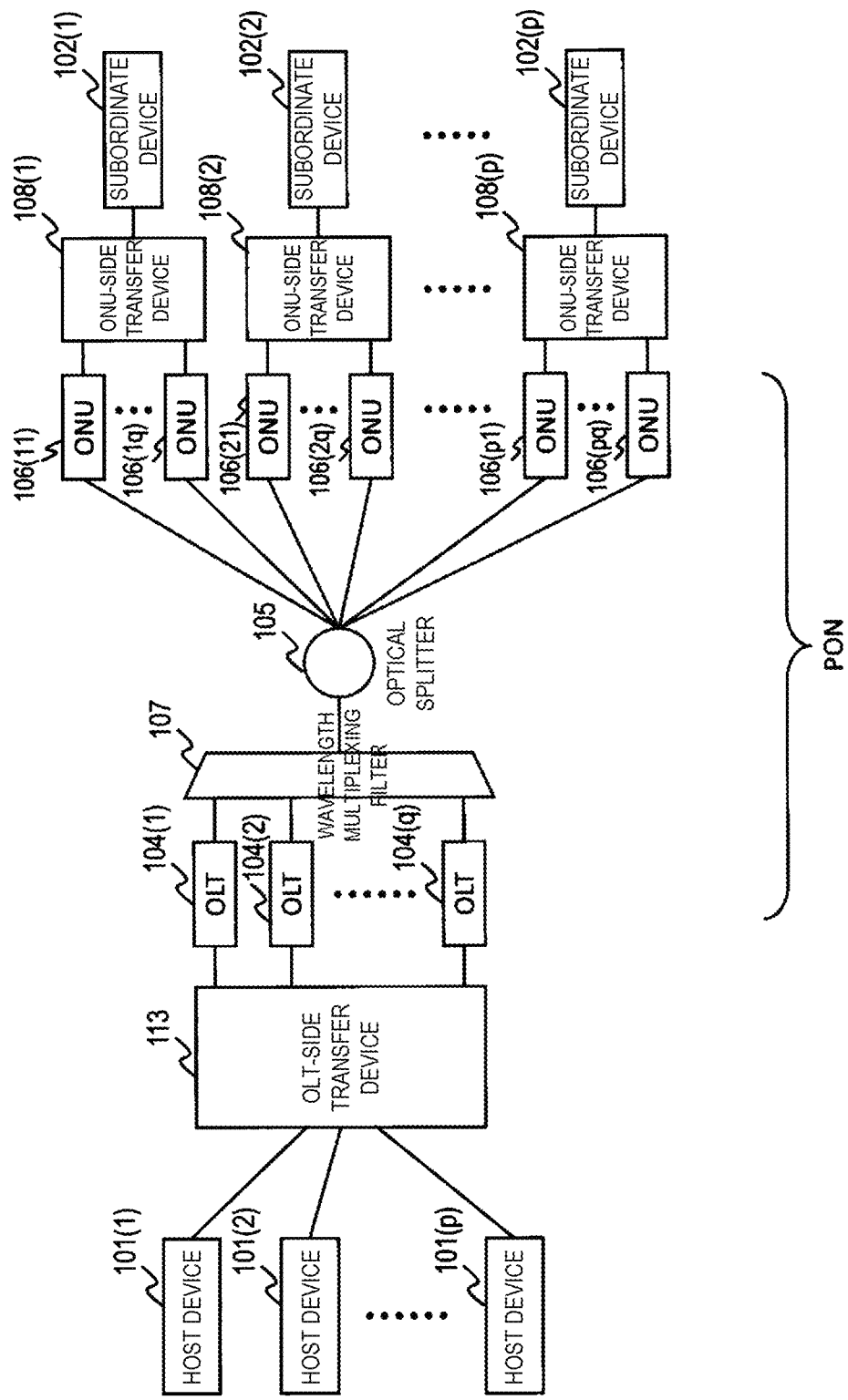
FIG. 9 illustrates an example of a configuration in which frames between host devices and subordinate devices are distributed and transferred in parallel in a wavelength group consisting of a plurality of wavelengths.
Figure 10:
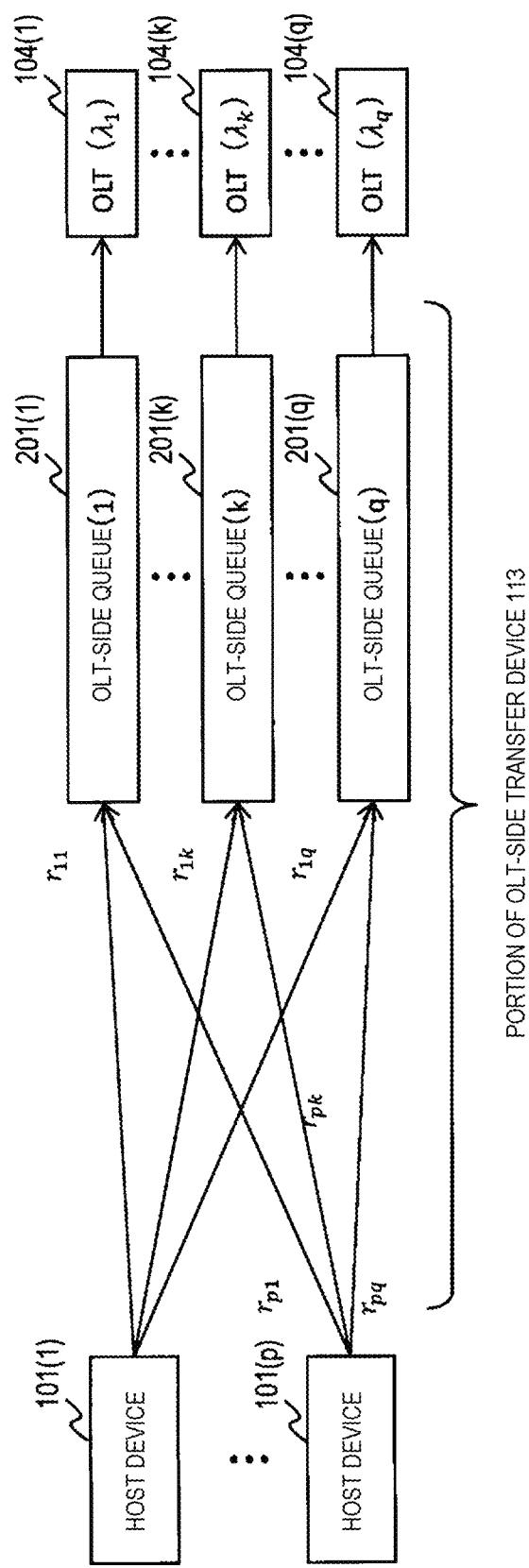
FIG. 10 is a diagram illustrating an example of a queue configuration when downstream frames are distributed and transferred in parallel over a plurality of wavelengths.

Although the OLTs 104 connected to the OLT-side transfer device 103 use the plurality of wavelengths unique to the OLTs 104 in the system of the first embodiment as shown in FIG. 9, in the second embodiment, all the OLTs 104 use an identical wavelength. In the example of FIG. 6, there is no wavelength multiplexing filter 107 installed between the groups of OLTs 104 and the optical splitter 105 in FIG. 9, and the same number of optical splitters 105 as the number of OLTs 104 is installed, and the OLTs 104 are connected to the optical splitters 105 in a one-to-one manner. In this way, each of the OLTs 104 can use an identical wavelength.

Note that, although the number of OLTs 104 is set to two in FIG. 6, the number of OLTs 104 may be any positive integer.

Also, although all of the subordinate devices 102 are connected to two ONUs 106 via an ONU-side transfer device 108 in FIG. 6, the number of ONUs 106 connected to a subordinate device 102 may vary.

As described above, in the communication system in which a PON is applied to frame transfer between the host devices 101 and the subordinate devices 102 in the present embodiment, downstream frames can be distributed to the plurality of OLTs each using an identical wavelength to satisfy a desired delay requirement.

Note that the transfer method for downstream frames performed by the OLT-side transfer device 103 described in the first and second embodiments can also be realized by a computer and a program, and the program can be recorded in a recording medium and/or provided through a network.

The transfer device, the transfer method, and the transfer program for downstream frames according to the present invention enable downstream frames to be distributed to a plurality of OLTs to satisfy a desired delay requirement in a communication system in which a PON is applied to frame transfer between a host device and a subordinate device.

REFERENCE SIGNS LIST

101 Host device
102 Subordinate device
103, 113 OLT-side transfer device
104 OLT
105 Optical splitter
106 ONU
107 Wavelength multiplexing filter
108 ONU-side transfer device
201 OLT-side queue
301, 311 Frame sorting unit
302 Frame storage unit
303 Frame information acquisition unit
304 Distribution control determination unit
401 Frame storage unit
402 Frame output unit
501 ONU-side queue

The invention claimed is:

1. A transfer device installed between a host device and a plurality of OLTs in a communication system to which a network with a PON configuration including the plurality of OLTs between the host device and a subordinate device is applied, the transfer device comprising:
a frame information acquisition unit configured to monitor downstream frames input from the host device and calculate a statistical value of the downstream frames per a predetermined fixed cycle;
a frame storage unit including a plurality of queues each configured to store downstream frames to be transferred to the plurality of OLTs, the frame storage unit configured to store the downstream frames input from the host device;
a frame sorting unit configured to input the downstream frames to the plurality of queues included in the frame storage unit; and
a distribution control determination unit configured to determine the number of frames to be sequentially input by the frame sorting unit to the plurality of queues based on the statistical value.

2. The transfer device according to claim 1,
wherein, when the number of host devices is p, the number of parallels in a PON section is q, a minimum integer exceeding the number obtained by dividing the value of the total number of frames input until the frames of all of the host devices take turns around the plurality of queues by the number of OLTs is N, an optical communication speed in the PON section is B, a speed at which a host device i (i is an integer from 1 to p) outputs frames to the transfer device is Ri, the statistical value of the number of downstream frames per the predetermined fixed cycle of the host device i is ni, the statistical value of a maximum value of a downstream frame size per the predetermined fixed cycle is s, a predetermined delay upper limit is y, and the number of frames of the host device i that the frame sorting unit sequentially inputs to the queue connected to an OLTk (k is an integer from 1 to q) is $r_{ik}$, the distribution control determination unit determines N to satisfy the following equation

[Math. 1] (1)

$$N = \left\lceil \frac{1}{q} \sum_{i=1}^{p} \left\lceil \frac{NR_i n_i s}{(n_i - 1)Bs + yBR_i - (N - 1)R_i s} \right\rceil \right\rceil,$$

and determines $r_{ik}$ to satisfy the following equation based on the determined N

[Math. 2] (2)

$$\sum_{k=1}^{q} r_{ik} = \left\lceil \frac{NR_i n_i s}{(n_i - 1)Bs + yBR_i - (N - 1)R_i s} \right\rceil.$$

3. The transfer device according to claim 2, wherein the distribution control determination unit sets, in an initial state, the number of downstream frames sequentially input to the plurality of queues in the frame storage unit to 0 or 1, and after the frame information acquisition unit completes calculation of the statistical value, determines the number of downstream frames to be sequentially input into the plurality of queues in the frame storage unit using the statistical value.

4. The transfer device according to claim 1,
wherein the frame information acquisition unit calculates, as the statistical value, an average of the number of downstream frames per the predetermined fixed cycle and an average of the maximum value of a downstream frame size per the predetermined fixed cycle.

5. A non-transitory computer-readable storage medium storing a transfer program causing a computer to execute a process performed by the transfer device according to claim 1.

6. A transfer method for processing of a transfer device installed between a host device and a plurality of OLTs in a communication system to which a network with a PON configuration including the plurality of OLTs between the host device and a subordinate device is applied, the transfer method comprising:
a frame information acquisition process of monitoring downstream frames input from the host device and calculating a statistical value of the downstream frames per a predetermined fixed cycle;
a frame storage process of storing, downstream frames input from the host device to be transferred to the plurality of OLTs in a plurality of queues;
a frame sorting process of inputting the downstream frames to the plurality of queues; and
a distribution control determination process of determining the number of frames to be sequentially input to the plurality of queues in the frame sorting process unit based on the statistical value.

7. The transfer device according to claim 6,
wherein, in the distribution control determination process, when the number of host devices is p, the number of parallels in a PON section is q, a minimum integer exceeding the number obtained by dividing the value of the total number of frames input until the frames of all of the host devices take turns around the plurality of queues by the number of OLTs is N, an optical communication speed in the PON section is B, a speed at which a host device i (i is an integer from 1 to p) outputs frames to the transfer device is Ri, the statistical value of the number of downstream frames per the predetermined fixed cycle of the host device i is ni, the statistical value of a maximum value of a downstream frame size per the predetermined fixed cycle is s, a predetermined delay upper limit is y, and the number of frames of the host device i that the frame sorting unit sequentially inputs to the queue connected to an OLTk (k is an integer from 1 to q) is $r_{ik}$, N is determined to satisfy the following equation

[Math. 1] (1)

$$N = \left\lceil \frac{1}{q} \sum_{i=1}^{p} \left\lceil \frac{NR_i n_i s}{(n_i - 1)Bs + yBR_i - (N - 1)R_i s} \right\rceil \right\rceil,$$

and $r_{ik}$ is determined to satisfy the following equation based on the determined N

[Math. 2] (2)

$$\sum_{k=1}^{q} r_{ik} = \left\lceil \frac{NR_i n_i s}{(n_i - 1)Bs + yBR_i - (N - 1)R_i s} \right\rceil.$$

8. The transfer method according to claim 6,
wherein, in the frame information acquisition process, an average of the number of downstream frames per the predetermined fixed cycle and an average of the maximum value of the downstream frame size per the predetermined fixed cycle are calculated as the statistical value.

* * * * *